3,239,475
COATINGS FOR FIBROUS BOARDS
Vincent de P. Clark, Newark, Ohio, assignor to Owens-Corning Fiberglas Corporation, a corporation of Delaware
No Drawing. Filed Dec. 28, 1961, Ser. No. 162,974
10 Claims. (Cl. 260—17)

This invention relates to paint compositions and particularly to water-base paints suited for use on fibrous products.

There are many formulations for protective coatings and paints; however, as is well known, there is no universal paint suitable for use on all materials and for all service conditions. Instead paints are generally formulated for specific uses and rather specific service conditions. Paints used for finishing fibrous materials require properties derived by special formulation. Fibrous boards such as those comprising glass fibers bonded together into an integral structure, board, or panel for controlling acoustics are painted for improved appearance. Paints for such products must have unique properties to satisfy unique requirements not met by the vast number of commercially available paints marketed for other uses.

It is an object of this invention to provide a paint suitable for use on fibrous glass products.

It is a further object to provide improved surfacing treatment for acoustical boards comprising fibers.

It is also an object to provide an attractive surface upon an acoustical board without substantially reducing its sound adsorbtion characteristics.

Other objects will become apparent from the following description and the claims.

These objects are attained by formulation of water-base paints having particular covering properties suitable for fibrous boards as illustrated in the following recipes. It will be noted that these compositions comprise water, pigment, vehicle and a fungicide as basic components in specified proportions mixed to the proper consistency as indicated.

*Example 1*

| | Parts by weight |
|---|---|
| Water | 1000 |
| Sodium salt of a polyelectrolyte | 13 |
| Titania | 400 |
| Talc | 1250 |
| Methyl cellulose | 4.5 |
| Poly(ethylene oxide) | 4.5 |
| Mica | 550 |
| Phenyl mercuric acetate | 13.5 |
| Calcium silicate (Wollastonite) | 400 |
| Calcium carbonate | 1150 |

Mix for 15 minutes.

| | Parts |
|---|---|
| Hexylene glycol | 63 |
| Hydroxy ethyl cellulose | 2.25 |

Mix for 10 minutes.

| | |
|---|---|
| Polyvinyl acetate | 765 |

Mix for 10 minutes.

Additional water is added as needed to make a total of 2300 parts of water. The talc used comprises 750 parts of No. 40 talc supplied by Whittaker, Clark and Daniels, Inc. This is a light grey Vermont talc having a specific gravity of 2.98, a true density of 24.8 lbs./gallon, an average particle size of 5 microns and 99.8% of this talc passes through a 325 mesh screen. The typical chemical composition of the talc is as follows:

| | Percent |
|---|---|
| $SiO_2$ | 59.15 |
| $Al_2O_3$ | 0.26 |
| $Fe_2O_3$ | 3.36 |
| CaO | 0.15 |
| MgO | 31.34 |
| $CO_2$ | 1.76 |
| MnO | 0.03 |

In addition to the No. 40 talc, 500 parts of No. 140 talc is used. This talc from the same supplier is a white Alabama talc having a specific gravity of 2.79, a true density of 23.16 lbs./gallon, and 100% of the talc passes through a 325 mesh screen. The typical chemical analysis of this talc is as follows:

| | Percent |
|---|---|
| $SiO_2$ | 61.22 |
| $Al_2O_3$ | 0.42 |
| $Fe_2O_3$ | 0.58 |
| CaO | 0.05 |
| MgO | 32.56 |

The particle size and shape are important. Platelets of the specified size are required.

These materials are added to the water in the order indicated with stirring to provide a paint suitable for application to acoustical board or tile of fibrous glass.

The polyvinyl acetate is purchased from Shawinigan Resins Corp. as Gelva-S-4321A, a latex which contains an emulsifier that acts as a dispersant. This material is 55% solids, and has a surface tension of 48–50 dynes per cm., and a pH of 4.5 to 5.5. Polyvinyl acetate acts as a binder and a vehicle in the paint. The poly(ethylene oxide) is purchased from Union Carbide Corp. as Polyox WRS–301. This material is fully disclosed in the Encyclopedia of Chemical Technology by Kirk-Othmer, second supplement volume, see pp. 597–609 (authors Messrs. George M. Powell III and Frederic E. Bailey, Jr., of Union Carbide Corporation). This material thickens the mix, regulates surface tension and acts as a viscosity stabilizer. The sodium salt of a polyelectrolyte used in Examples 1, 3 and 4 is Daxad 30 supplied by Dewey Almy Chemical Co. as a 25% water solution. Its specific gravity is 1.16 at 25° C., pH 9.5 to 10.5 and surface tension 69.8 dynes per cm. at 25° C. The phenyl mercuric acetate is PMA-30 purchased from the Troy Chemical Co. as a 30% solution. The titania is Titanox A-168 LO and Zopaque LDM supplied by Titanium Pigments Corp. and the Glidden Co., respectively. The calcium carbonate is purchased as Calwhite from the Georgia Marble Co. These materials are replaceable by other available forms of the fully identified chemicals.

The above composition is a paint which provides excellent hiding power, good hold out (a measure of the ability of the paint to cover indentations and unevenness in the substrate), and a viscosity which is correct for spray application of the plaint. A viscosity of 63–70 Krebs' units on the Stormer viscosimeter is desired when the paint is spray applied. High viscosities provide improved hold out but deleteriously affect the sprayability of the paint. Proper hold out here requires non-bridging and a visibly porous surface that provides suitable acoustical properties. Increasing the porosity is accomplished by introducing additional poly(ethylene oxide) thickener; however, drying of the resulting paint becomes more difficult since the paint is more gel-like upon further addition of the thickener. The poly(ethylene oxide) thickener apparently is one of the materials which provides non-bridging. Non-wetting is desirable for the particular use contemplated; i.e., application to fibrous glass substrates such as acoustical board and the like. Ordinary paints require brushability, good leveling, and good wetting; however, none of these properties are provided nor desired in applicant's paints. The phenyl mercuric acetate is added to prevent mold or bacteria growth in the paint and in the dried deposit of the finished coating.

Another example of a paint composition within the scope of the invention is as follows:

Example 2

| | Parts by weight |
|---|---|
| Water | 1667 |
| Polyvinyl alcohol (partially hydrolized) | 3 |
| Polyvinyl acetate homopolymer | 250 |
| Poly(ethylene oxide) | 4 |
| Hydroxyethyl cellulose | 2.5 |
| Phenyl mercuric acetate | 13.5 |
| Titanium dioxide (anatase) | 250 |
| Calcined clay | 250 |
| Talc | 1200 |

Add water to make a total of 2295 parts of water.

| | |
|---|---|
| Calcium silicate (Wollastonite) | 1250 |
| Silica | 1000 |

Disperse the above ingredients by mixing for 20 minutes with a high speed mixer.

| | Parts |
|---|---|
| Polyvinyl acetate homopolymer | 350 |
| Hydroxyethyl cellulose | 4.5 |
| Poly(ethylene oxide) | 2 |

Mix for 20 additional minutes at high speed to produce about 510 gallons (6870 lbs.) of paint when the parts are pounds.

The poly(ethylene oxide) thickens the paint composition, regulates surface tension and is a viscosity stabilizer. The phenyl mercuric acetate prevents the growth of mold and bacteria in the paint when it is stored and when applied. The clay, talc, calcium silicate, titania and silica are filler pigments. The talc comprises equal portions of Whittaker No. 140 Alabama talc which has a specific gravity of 2.79, a true density of 23.16 pounds per gallon and Whittaker No. 117 Alpine talc having a specific gravity of 2.79 and a true density of 23.6 pounds per gallon. One-hundred percent of the former talc passes through a 325 mesh screen while 98.5% of the latter passes through a 200 mesh screen. The hydroxyethyl cellulose is a thickener and viscosity stabilizer. The refractive index of the extenders (clay, talc, etc.) utilized is between about 1.48–1.6. The refractive index of the titania is 2.55. The clay is supplied as Alsilate O by Southern Clays Inc. The polyvinyl alcohol is Gelvatol 20–30.

This composition has been found to be an excellent paint for providing a good appearance while retaining the inherent acoustical properties of a fibrous glass board or panel. The paint is applied by spraying, flooding or brushing techniques and preferably by spray methods.

These paints are especially suited for and have been applied to fibrous glass boards having an apparent density of about eleven pounds per cubic foot (11 p.c.f.). The fibrous glass boards are fibers bonded together by a phenolic binder. Although the fibers are bonded together by a phenolic resin, the interstices of the fibers remain open and most of the resin gathers at junctures of contacting fibers. The binder on the fibers is generally about 9% of the total weight of binder and fibers.

It is also desirable to have air spaces or voids in the paint applied to these boards, since it is the difference in index of refraction of components of the paint such as titania and that of the air spaces in the paint layer which provides the apparent white surface strived for. If the difference of index is reduced, the white appearance is destroyed. More titania must be used if the amount of binder (polyvinyl acetate) in the paint is increased.

Further compositions which dry to form hard surface coatings that resist mechanical abrasion and wear and provide the desired appearance are as follows:

Example 3

| | Parts by weight |
|---|---|
| Water | 1250 |
| Polyvinyl alcohol | 5 |
| Hydroxyethyl cellulose | 5 |
| Sodium salt of a polyelectrolyte | 15 |
| Titania | 350 |
| Calcined clay | 400 |

Add water to make a total of 1734 parts water.

| | |
|---|---|
| Talc | 1200 |
| Calcium carbonate | 1800 |

Disperse for 15 minutes.

| | |
|---|---|
| Polyvinyl acetate | 1200 |
| Poly(ethylene oxide) | 2 |
| Phenyl mercuric acetate | 13.5 |

Mix for 15 minutes.

The polyvinyl alcohol, hydroxyethyl cellulose and the sodium salt of a polyelectrolyte are all considered to be stabilizers and they may also act as thickeners in the resulting compositions. The talc utilized here is an Alabama talc, 98.5% of which passes through a 200 mesh screen. The total amount of paint produced is 500 gallon or 6720 lbs. when the parts by weight are pounds. This composition is applied by edge rollers to the edges of acoustical boards.

Another satisfactory paint is illustrated in the following example:

Example 4

| | Parts by weight |
|---|---|
| Water | 1667 |
| Polyvinyl acetate homopolymer | 200 |
| Polyvinyl alcohol | 2 |
| Sodium salt of a polyelectrolyte | 9 |
| Methyl cellulose | 3 |
| Hydroxyethyl cellulose | 1 |
| Poly(ethylene oxide) | 4 |
| Titania | 350 |
| Calcined clay | 100 |
| Talc | 1250 |

Add water to make a total of 2168 parts of water.

| | Parts |
|---|---|
| Mica | 350 |
| Calcium silicate (Wollastonite) | 650 |
| Calcium carbonate | 750 |
| Silica | 350 |

Disperse for 15 minutes.

| | |
|---|---|
| Polyvinyl acetate homopolymer | 500 |
| Poly(ethylene oxide) | 1 |
| Hydroxyethyl cellulose | 2.5 |
| Hexylene glycol | 42 |
| Phenyl mercuric acetate | 13.5 |

Mix for 20 minutes.

When the parts by weight are pounds, the above mixture produces 500 gallons or 6744 pounds. The talc herein comprises 550 parts of an Alabama talc having a specific gravity of 2.79, 100% of which passes through a 325 mesh screen, 500 parts of a Vermont talc having a specific gravity of 2.98, 99.99% of which passes through a 200 mesh screen and 99.98% through a 325 mesh screen, and 200 parts of an Alabama talc having a specific gravity of 2.79 and 98.5% of which passes through a 200 mesh screen.

A further example of a paint which has been found satisfactory for finishing fibrous glass acoustical boards having an apparent density of about eleven pounds per cubic foot includes the following ingredients in the indicated proportions expressed in parts by weight.

Example 5

| | Parts by weight |
|---|---|
| Water | 1500 |
| Polyvinyl acetate | 600 |
| Polyvinyl alcohol | 6 |
| Poly(ethylene oxide) | 6 |
| Titania | 250 |
| Calcined clay | 250 |
| Talc | 1200 |

Add water to make a total of 2168 parts of water

| | |
|---|---|
| Calcium silicate (Wollastonite) | 1250 |
| Silica | 1000 |

Mix for 20 minutes.

| | |
|---|---|
| Polyvinyl alcohol | 135 |
| Phenyl mercuric acetate | 13.5 |

Mix for 10 minutes.

When the parts by weight are pounds, 500 gallons or 6876 pounds of paint are produced. The talc comprises equal portions of an Alabama talc having a specific gravity of 2.79 and a sieve fineness of 98.5% through a 200 mesh screen and an Alabama talc having a specific gravity of 2.79 and a sieve fineness of 100% through a 325 mesh screen. The polyvinyl alcohol comprises 6 parts of Gelvatol 20-30 and 135 parts of Gelvatol 1–90G, which is an 8% aqueous solution.

It has been found that these compositions preferably comprise from 1500 to 2500 parts of water, from 600 to 1200 parts of vehicle, from 3000 to 4000 parts of pigment, from 10 to 30 parts of a stabilizer, and a fungicide.

Compositions especially suited for painting fibrous boards to be utilized in acoustical treatments have been provided. Compositions comprising a latex, a thickener, a stabilizer and finely-divided solids in a water dispersion provide the unique covering properties and physical appearance required in the acoustical board paints. A discontinuous coating which provides a uniform over-all surface appearance and character is provided.

The extender pigments can be wholly or partially replaced with barytes, natural clays or other like materials. A suitable Wollastonite has an acicular crystal structure, a refractive index of 1.63, pH of 9.9, specific gravity of 2.9, apparent density of 50 lbs./cu. ft., and a hardness of 4.5 on the Mohs scale. The polyvinyl acetate vehicle may be replaced with a suitable acrylic resinous dispersion. Paints such as those disclosed are generally applied to boards which have been already prime coated with a primer paint.

Variations and modifications may be made within the spirit and scope of the following claims.

I claim:

1. A paint composition capable of producing a decorative finish on acoustical boards and of forming a porous surface to retain acoustical properties comprising:

| | Parts by weight |
|---|---|
| Water | 2300 |
| Polyvinyl acetate | 765 |
| Poly(ethylene oxide) | 4.5 |
| Hydroxyethyl cellulose | 2.25 |
| Methyl cellulose | 4.5 |
| Sodium salt of polyelectrolyte | 13 |
| Titania | 400 |
| Talc | 1250 |
| Calcium silicate | 400 |
| Calcium carbonate | 1150 |
| Phenyl mercuric acetate | 13.5 |
| Mica | 550 |
| Hexylene glycol | 63 | said polyvinyl acetate being an emulsion having a surface tension of about 48–50 dynes per centimeter at 25° C.

2. A paint composition capable of producing a decorative finish on acoustical boards and of forming a porous surface to retain acoustical properties comprising:

| | Parts by weight |
|---|---|
| Water | 2295 |
| Polyvinyl acetate | 600 |
| Poly(ethylene oxide) | 6 |
| Hydroxyethyl cellulose | 7 |
| Polyvinyl alcohol | 3 |
| Titania | 250 |
| Clay | 250 |
| Talc | 1200 |
| Calcium silicate | 1250 |
| Silica | 1000 |
| Phenyl mercuric acetate | 13.5 | said polyvinyl acetate being an emulsion having a surface tension of about 48–50 dynes per centimeter at 25° C.

3. A paint composition capable of producing a decorative finish on acoustical boards and of forming a porous surface to retain acoustical properties comprising:

| | Parts by weight |
|---|---|
| Water | 1734 |
| Polyvinyl acetate | 1200 |
| Poly(ethylene oxide) | 2 |
| Hydroxyethyl cellulose | 5 |
| Sodium salt of polyelectrolyte | 15 |
| Polyvinyl alcohol | 5 |
| Titania | 350 |
| Clay | 400 |
| Talc | 1200 |
| Calcium carbonate | 1800 |
| Phenyl mercuric acetate | 13.5 | said polyvinyl acetate being an emulsion having a surface tension of about 48–50 dynes per centimeter at 25° C.

4. A paint composition capable of producing a decorative finish on acoustical boards and of forming a porous surface to retain acoustical properties comprising:

| | Parts by weight |
|---|---|
| Water | 2168 |
| Polyvinyl acetate | 700 |
| Poly(ethylene oxide) | 5 |
| Hydroxyethyl cellulose | 3.5 |
| Methyl cellulose | 3 |
| Sodium salt of polyelectrolyte | 9 |
| Polyvinyl alcohol | 2 |
| Titania | 350 |
| Clay | 100 |
| Talc | 1250 |
| Calcium silicate | 650 |
| Calcium carbonate | 750 |
| Silica | 350 |
| Phenyl mercuric acetate | 13.5 |
| Mica | 350 |
| Hexylene glycol | 42 | said polyvinyl acetate being an emulsion having a surface tension of about 48–50 dynes per centimeter at 25° C.

5. A paint composition capable of producing a decorative finish on acoustical boards and of forming a porous surface to retain acoustical properties comprising:

| | Parts by weight |
|---|---|
| Water | 2168 |
| Polyvinyl acetate | 600 |
| Poly(ethylene oxide) | 6 |
| Polyvinyl alcohol | 6 |
| Titania | 250 |
| Clay | 250 |
| Talc | 1200 |
| Calcium silicate | 1250 |
| Silica | 1000 |
| Phenyl mercuric acetate | 13.5 |
| Polyvinyl alcohol 8% aqueous solution | 135 | said polyvinyl acetate being an emulsion having a surface tension of about 48–50 dynes per centimeter at 25° C.

6. A fibrous acoustical board comprising a plurality of haphazardly arranged fibers bonded together, at least one surface of said board being finished with a porous dried deposit of a paint which provides good appearance without destroying the acoustical properties of the board, which paint comprises the composition of claim 1.

7. A fibrous acoustical board comprising a plurality of haphazardly arranged fibers bonded together, at least one surface of said board being finished with a porous dried deposit of a paint which provides good appearance without destroying the acoustical properties of the board, which paint comprises the composition of claim 2.

8. A fibrous acoustical board comprising a plurality of haphazardly arranged fibers bonded together, at least one surface of said board being finished with a porous dried deposit of a paint which provides good appearances without destroying the acoustical properties of the board, which paint comprises the composition of claim 3.

9. A fibrous acoustical board comprising a plurality of haphazardly arranged fibers bonded together, at least one surface of said board being finished with a porous dried deposit of a paint which provides good appearance without destroying the acoustical properties of the board, which paint comprises the composition of claim 4.

10. A fibrous acoustical board comprising a plurality of haphazardly arranged fibers bonded together, at least one surface of said board being finished with a porous dried deposit of a paint which provides good appearance without destroying the acoustical properties of the board, which paint comprises the composition of claim 5.

References Cited by the Examiner

UNITED STATES PATENTS

| | | | |
|---|---|---|---|
| 2,567,678 | 11/1951 | Morrison | 260—29.6 |
| 2,795,564 | 6/1957 | Conn et al. | 260—29.6 |
| 2,833,737 | 5/1958 | Mark et al. | 260—29.6 |
| 2,855,327 | 10/1958 | Gilchrist et al. | 117—140 |
| 3,010,929 | 11/1961 | Jones | 260—29.6 |

OTHER REFERENCES

Chemical and Engineering News, November 11, 1957, page 62.

JOSEPH L. SCHOFER, *Primary Examiner.*

LEON J. BERCOVITZ, *Examiner.*